(12) United States Patent
Horstman et al.

(10) Patent No.: US 7,410,105 B2
(45) Date of Patent: Aug. 12, 2008

(54) SPRAYER AND FILTER THEREFOR

(75) Inventors: Richard Lawrence Horstman, Cincinnati, OH (US); Eric Richard Bartsch, Cincinnati, OH (US); John Allen Wooton, New Richmond, OH (US); Jonathan George Denham, Cincinnati, OH (US); John Edward Sheppard, Market Harborough (GB); Richard John Stevens, Leicester (GB); Ronald Howard Wanless, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/950,841

(22) Filed: Sep. 11, 2001

(65) Prior Publication Data

US 2002/0185420 A1 Dec. 12, 2002

Related U.S. Application Data

(63) Continuation-in-part of application No. 09/875,686, filed on Jun. 6, 2001.

(51) Int. Cl.
*B05B 7/26* (2006.01)
*B05B 7/02* (2006.01)
*B05B 1/14* (2006.01)

(52) U.S. Cl. .................. 239/315; 239/525; 239/526; 239/462

(58) Field of Classification Search .................. 239/315, 239/553, 462, 548, 316, 375, 378, 525, 526, 239/DIG. 14, 398, 435
See application file for complete search history.

(56) References Cited

U.S. PATENT DOCUMENTS

| 1,872,058 A | 8/1932 | Bramsen et al. |
| D110,841 S | 8/1938 | Tobler |
| 3,339,841 A | 9/1967 | Beach, Jr. |

(Continued)

FOREIGN PATENT DOCUMENTS

| EP | 0 808 662 A2 | 11/1997 |
| JP | 08266956 | 10/1996 |
| WO | WO 97/48927 A1 | 12/1997 |
| WO | WO 98/10223 A1 | 1/1998 |
| WO | WO 01/96036 A1 | 12/2001 |

OTHER PUBLICATIONS

*Emson*, A company by the name of Emson makes or sells a sprayer similar to the "Happy Garden" sprayer sold by Kress+Kastner described below. The sprayer appears to have been made in China, is blue in color, and marked as Item No. 5168. It has a longer "barrel" than the Kress+Kastner sprayer. It is marked with U.S. Patent 4,785,850 and Canadian Patent 1,308,697.

(Continued)

*Primary Examiner*—Davis Hwu
(74) *Attorney, Agent, or Firm*—Jeffrey V. Bamber; Amy I. Ahn-Roll

(57) ABSTRACT

A sprayer, which in one embodiment, is a hand held ergonomic sprayer is disclosed herein. The sprayer may include: a housing through which water flows; a handle for gripping by a user, which is joined to the housing; at least one spray nozzle operatively connected to the housing; and, a connection for a hose, the connection being joined to the housing. In one non-limiting embodiment, when the sprayer has one end of a water-filled hose connected thereto, the combination of the sprayer and suspended portion of the hose has a combined center of gravity that passes through the axis of the sprayer handle. The sprayers described herein may also have other features, and provide other benefits that do not require the sprayers to have an ergonomic design.

6 Claims, 4 Drawing Sheets

U.S. PATENT DOCUMENTS

| | | | |
|---|---|---|---|
| D235,872 S | 7/1975 | Harussi | |
| 3,940,069 A | 2/1976 | Gunzel, Jr. et al. | |
| D252,097 S | 6/1979 | Probst et al. | |
| 4,242,201 A | 12/1980 | Stephens et al. | |
| 4,475,689 A | 10/1984 | Hauger et al. | |
| 4,628,644 A * | 12/1986 | Somers | 451/90 |
| 4,752,034 A * | 6/1988 | Kuhn et al. | 239/690 |
| 4,754,928 A | 7/1988 | Rogers et al. | |
| 4,785,850 A | 11/1988 | Sanchez | |
| 4,901,923 A | 2/1990 | McRoskey et al. | |
| 4,969,603 A | 11/1990 | Norman | |
| 5,110,479 A | 5/1992 | Frommer et al. | |
| 5,332,158 A | 7/1994 | Styne et al. | |
| D364,673 S | 11/1995 | Gustafsson | |
| 5,595,345 A | 1/1997 | Chura et al. | |
| 5,630,548 A | 5/1997 | Chih | |
| 5,662,273 A | 9/1997 | Chih | |
| 5,681,463 A | 10/1997 | Shimizu et al. | |
| 5,758,825 A | 6/1998 | Hsu | |
| 5,759,980 A | 6/1998 | Russo et al. | |
| 5,830,360 A | 11/1998 | Mozayeni | |
| 5,850,973 A | 12/1998 | Liljeqvist et al. | |
| 6,016,977 A * | 1/2000 | Farley | 239/553.3 |
| D422,055 S | 3/2000 | Stasny et al. | |
| 6,158,258 A | 12/2000 | Bowman | |
| 6,264,119 B1 | 7/2001 | Truong | |
| 6,375,094 B1 * | 4/2002 | Schroeder et al. | 239/113 |
| 6,378,789 B1 | 4/2002 | Seaman, Jr. et al. | |
| 2002/0046969 A1 | 4/2002 | Bartsch et al. | |
| 2002/0102359 A1 | 8/2002 | Rohrbaugh et al. | |
| 2002/0108640 A1 | 8/2002 | Barger et al. | |
| 2002/0144712 A1 | 10/2002 | Barger et al. | |
| 2002/0160224 A1 | 10/2002 | Barger et al. | |
| 2002/0179535 A1 | 12/2002 | Lutich | |

OTHER PUBLICATIONS

*Happy–Garden Sprayer*, Kress+Kastner sells a sprayer by the name of GARDENA® "Happy–Garden" Sprayer. A copy of the back of the package for this sprayer (showing the sprayer) is provided.

*Hydro Max Sprayer*, Target Corporation of Minneapolis, Minnesota distributes a sprayer known as the Hydro Max™ Spray Jet sprayer. A copy of the package for this sprayer is provided.

*Tornado Superjet™ SPRAYER*, Quantum Auto, Inc.of Los Angeles, California distributes products under the Auto Concepts™ brand name. One such product is a Sprayer known as the Tornado Superjet™ Sprayer. A copy of the package for this sprayer is provided. The package is marked with a copyright notice dated 1997. The package is also marked with U.S. Patents 5,630,548 and 5,662,273. Other U.S. and worldwide patents are said to be pending.

U.S. Appl. No. 09/875,686, filed Jun. 6, 2001, Bartsch et al.
U.S. Appl. No. 09/875,311, filed Jun. 6, 2001, Barger et al.
U.S. Appl. No. 09/950,757, filed Sep. 11, 2001, Rohrbaugh et al.
U.S. Appl. No. 09/972,090, filed Oct. 5, 2001, Barger et al.
U.S. Appl. No. 10/022,027, filed Dec. 13, 2001, Barger et al.

* cited by examiner

SPRAYER AND FILTER THEREFOR

CROSS REFERENCE TO RELATED PATENT APPLICATIONS

This application is a continuation-in-part of U.S. patent application Ser. No. 09/875,686, filed on Jun. 6, 2001, which claims the benefit of the filing date of PCT international patent application U.S. Ser. No. 00/16343 filed on Jun. 14, 2000.

FIELD OF THE INVENTION

The present invention relates to sprayers, and in one embodiment, to hand held sprayers that are ergonomically designed. The sprayers described herein may also have other features, and provide other benefits that do not require the sprayers to have an ergonomic design.

BACKGROUND OF THE INVENTION

A wide variety of spraying devices are known in the art. U.S. Pat. No. 4,969,603 issued to Norman discloses a sprayer in the form of an end of the hose spray gun having an interchangeable and disposable cleaning fluid cartridge. Typically, the water in the cartridges, or other containiner in such a sprayer will concentrate the weight of the sprayer in a portion of the sprayer that is positioned forward of the handle of the sprayer. This will place a strain on the hand and wrist of the person using the sprayer.

Therefore, there is a need for a sprayer, particularly an end of the hose sprayer having a portion for containing water, or another solution to be sprayed, that reduces the strain on the user's hand and wrist.

The sprayers described herein may also have other features, and provide other benefits that do not require the sprayers to have an ergonomic design.

SUMMARY OF THE INVENTION

The present invention relates to sprayers, and in one embodiment, to hand held sprayers that are ergonomically designed. The sprayers described herein may also have other features, and provide other benefits that do not require the sprayers to have an ergonomic design.

In one non-limiting embodiment, this invention relates to a hand-held ergonomic sprayer comprising:
- a housing through which water flows, said housing having a barrel portion;
- a handle for gripping by a user, said handle having an axis, said handle being joined to the housing;
- at least one spray nozzle operatively connected to the housing; and,
- a connection for a hose, said connection being joined to the housing, wherein said axis of the handle forms an angle of between about 75° to less than about 180° with said barrel portion, and said housing, when combined with a water-filled hose having an end connected to said connection, has a combined center of gravity that passes through the axis of the handle.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE INVENTION

Figure 1:
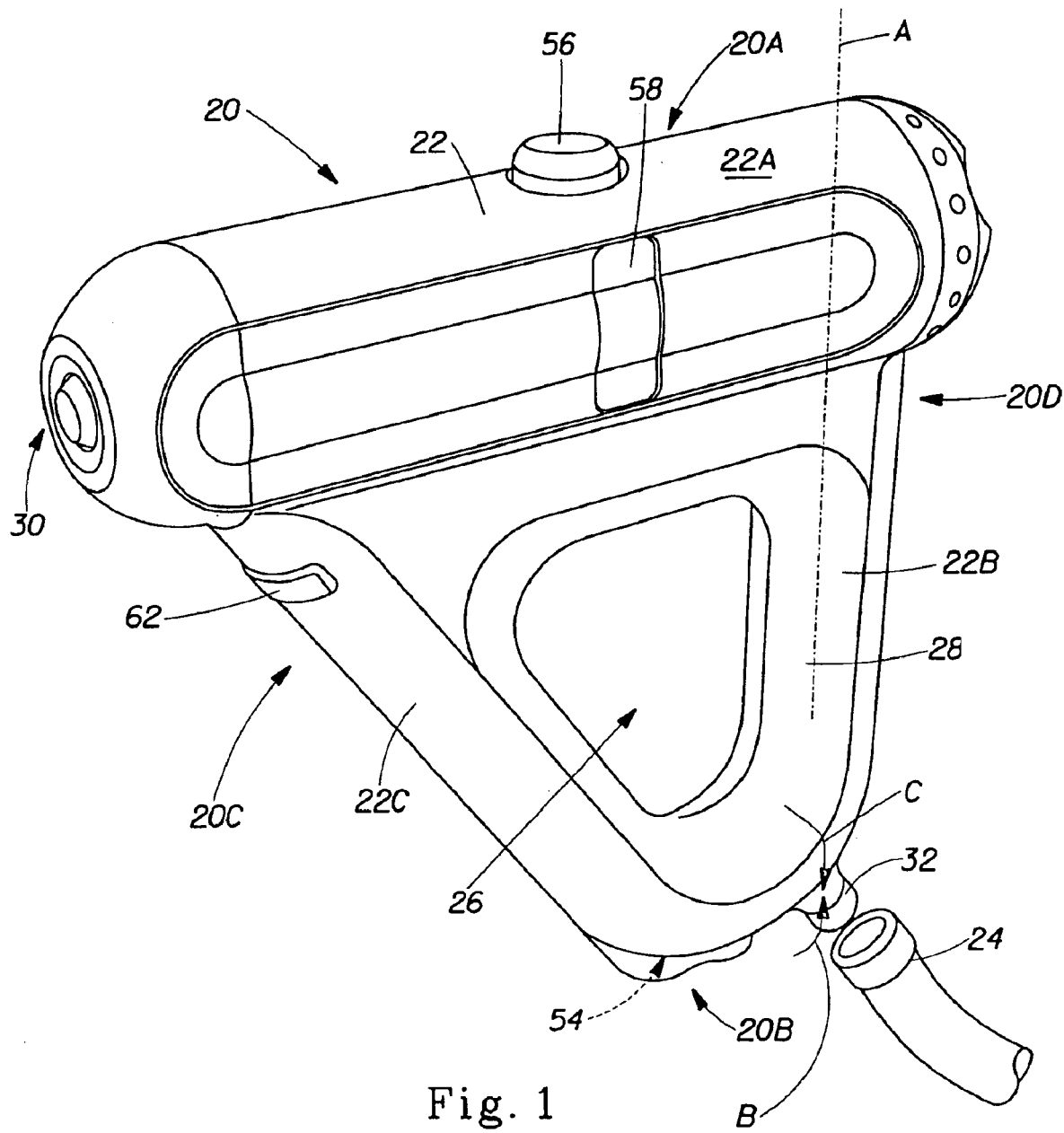
FIG. 1 is a perspective view of one non-limiting embodiment of an ergonomic sprayer.

The present invention relates to sprayers, and in one embodiment, to hand held sprayers that are ergonomically designed. The sprayers described herein may also have other features, and provide other benefits that do not require the sprayers to have an ergonomic design.

FIGS. 1–7 show one non-limiting embodiment of an ergonomically-designed, hand-held sprayer according to the present invention. It should be understood that the present invention is not limited to the embodiment shown in the drawings, and that the ergonomic sprayer may be provided in many other configurations.

Figures 2, 3:
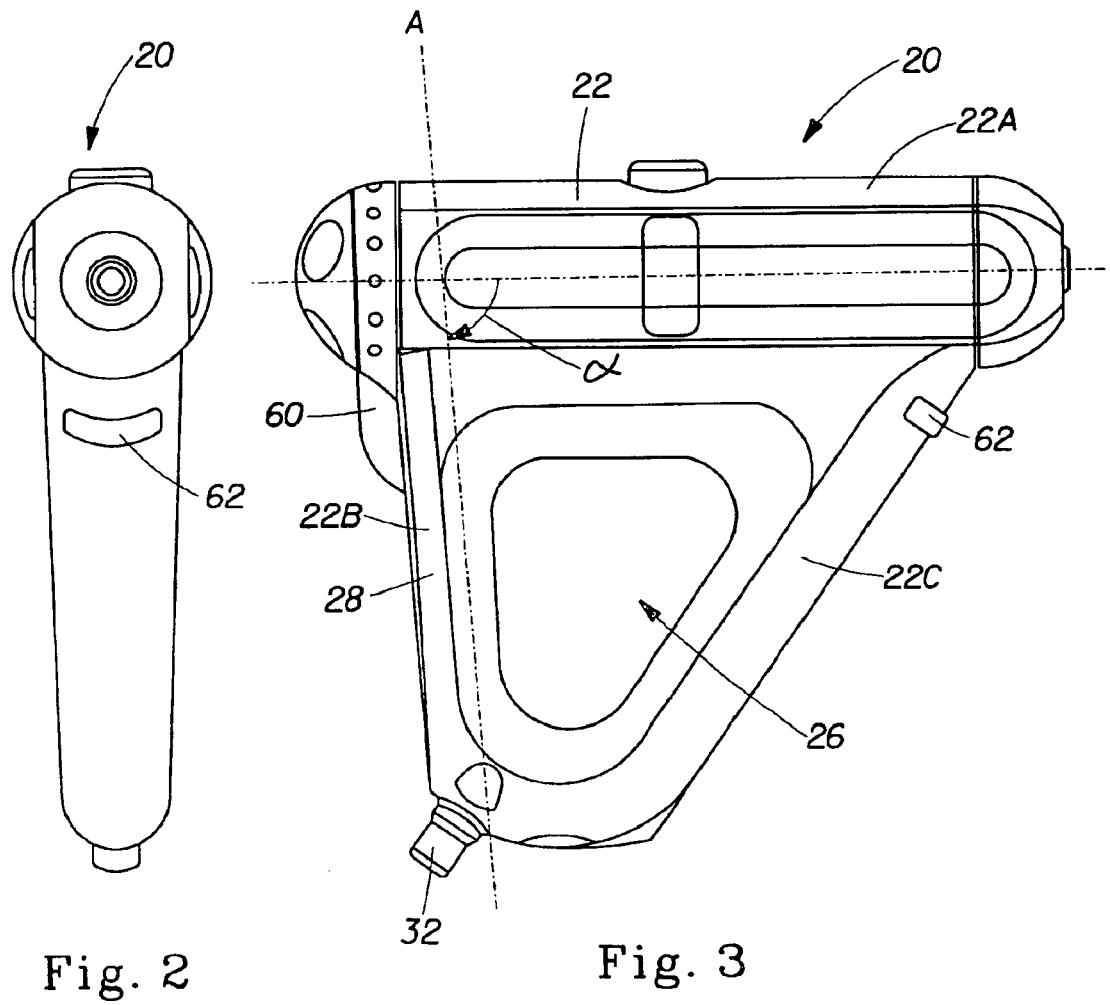
FIG. 2 is a front view of the sprayer.
FIG. 3 is a side elevational view from the left side of the sprayer as shown in FIG. 2.
Figure 4:
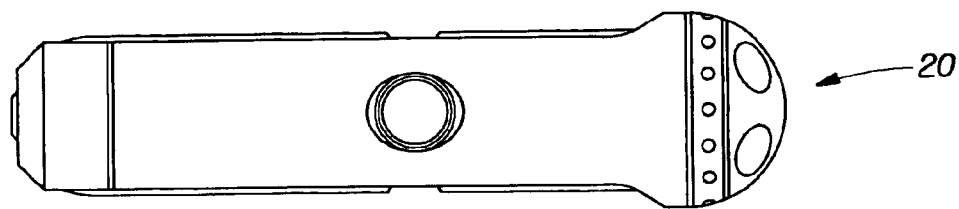
FIG. 4 is a top view of the sprayer.
Figure 5:
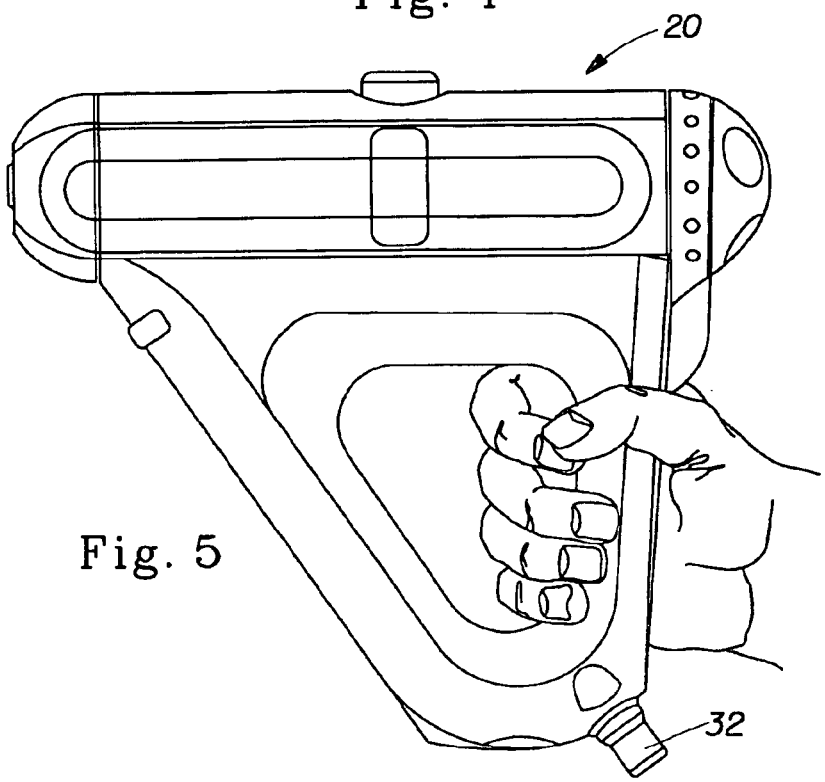
FIG. 5 is a side elevational view from the left side of the sprayer.
Figure 6:
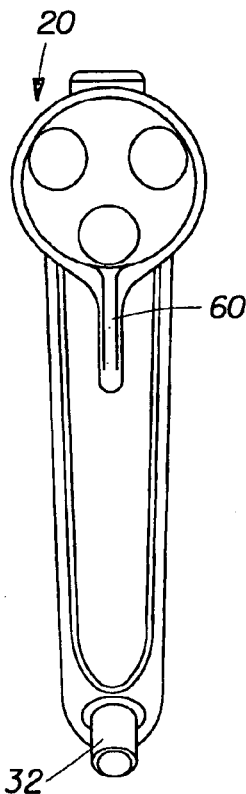
FIG. 6 is a rear view of the sprayer.
Figure 7:
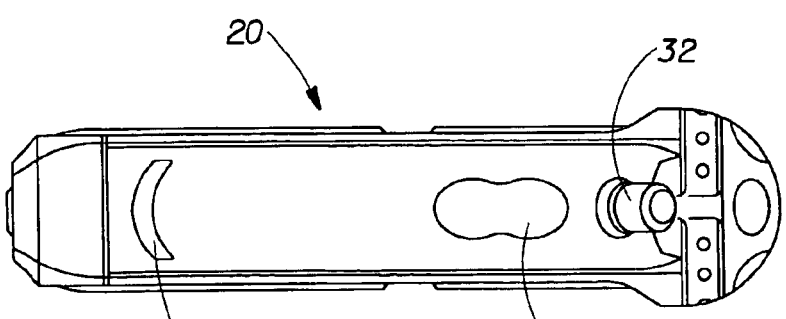
FIG. 7 is a bottom view of the sprayer.

As shown in FIG. 1, this embodiment of the ergonomic sprayer (or "sprayer") 20 has a generally triangular shape. More particularly, as shown in FIGS. 3 and 5, this sprayer 20 a right triangular shape when viewed from the side. The sprayer 20 has an upper portion 20A, an opposed lower portion 20B that is generally oriented toward the ground when the sprayer is in operation, a front portion 20C that is oriented toward the surface to be sprayed when the sprayer is in operation, and an opposed rear portion 20D.

The sprayer 20 comprises a housing or structure 22. In the embodiment shown, the housing 22 has a structure that forms a closed loop. This may provide the sprayer 20 with improved durability in comparison to sprayers that have components that extend outwardly in the form of free ends that are not joined to form a closed loop. Durability is of interest since the sprayer 20 may be dropped onto concrete, or other hard surfaces, such as when using the sprayer 20 to wash a car, for example.

In the embodiment shown, the housing 22 has three portions: first portion (or "barrel portion") 22A, second portion (or "handle portion) 22B, and third portion ("filter-containing portion") 22C. Each of these three portions has first and second ends that are joined as shown in the drawing figures to form the closed triangular shape. The ends of these portions of the housing can be referred to by any other suitable name, such as front end, rear end, upper end, and lower end, that describes their position or orientation. It will be appreciated that, if desired, the housing 22 can be formed into any number of other suitable shapes (other than a right triangular shape) that form a closed loop. Suitable shapes include, but are not limited to other types of triangles, or squares, rectangles, and the like. The portions of the housing 22 that form the closed loop are not limited to rectilinear portions. These portions may be rectilinear, curvilinear, or both. It should also be appreciated that, in alternative embodiments, the sprayer housing may be in a configuration that does not form a closed loop.

The housing 22 has a generally centrally located opening 26 and a handle 28 for gripping by a user. The handle has an axis, A. The sprayer further comprises at least one spray nozzle 30 that is operatively connected to the housing 22, and a hose connection (or simply "connection") 32 for a hose 24. Preferably water flows through at least some portions of the housing 22 when the sprayer 20 is connected to a hose 24 and is in use.

Figure 9:
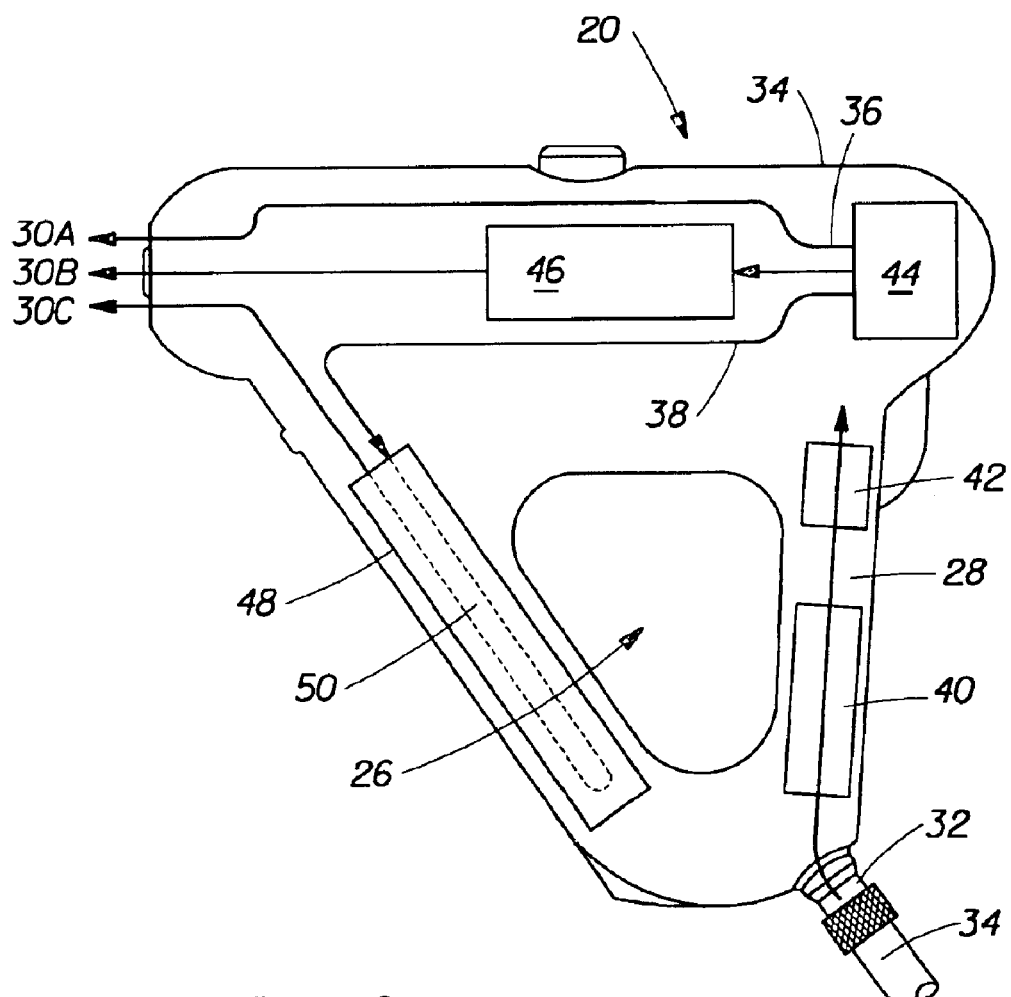
FIG. 9 is a schematic side view of the interior of the sprayer shown in FIGS. 1–7.

FIG. 9 is a schematic side view of the interior of the sprayer shown in FIGS. 1–7. FIG. 9 shows that in this embodiment, the sprayer 20 may also comprise one or more conduits (or flow channels or flow paths) through which water may flow. The sprayer housing 22 can comprise any suitable number of flow paths. Preferably, in the embodiment shown, the sprayer housing 22 comprises three flow paths 34, 36, and 38. The sprayer 20 may also comprise a flow regulator 40, an on/off switch 42, a flow selector 44, a compartment 46 for a composition to be dispensed, a filter compartment 48, and a filter 50.

The handle 28 can comprise a part of the housing 22, or it can comprise a separate element that is attached to the housing 22. The term "joined to", as used herein, includes embodiments in which an element such as the handle comprises a part of (or is integral with) another element, such as the housing 22, or in which the element comprises a separate element that is attached to another element, such as a separate handle that is attached to the housing 22. In the embodiment shown, the handle 28 comprises a portion of the housing 22. The handle 28 also comprises a portion of the housing 22 through which water flows. The axis, A, of the handle 28 preferably forms an angle α (shown in FIG. 3) of between about 75° to less than about 180°, preferably between about 85° to less than about 135°, and more preferably, about 90° with the barrel portion 22A of the housing 22. It should be understood that the user can hold the sprayer shown in the drawings by other portions thereof, such as by the barrel portion 22A, or by both the handle 28 and the barrel portion 22A, or by both the handle 28 and the filter-containing portion 22C. Thus, the location of the handle is not limited to the portion of the sprayer designated by reference number 28.

There can be any suitable number of spray nozzles 30. FIGS. 1–7 show that the sprayer 20 may have a single nozzle 30. FIG. 9 shows that in a preferred embodiment, the sprayer 20 has three nozzles. The spray nozzles 30 in the embodiment shown in FIG. 9 comprise a first nozzle 30A, a second nozzle 30B, and a third nozzle 30C. In this embodiment, the first nozzle 30A is used for dispensing unfiltered water. The second nozzle 30B is used for dispensing a solution, which in this particular case, is a cleaning solution comprising soap. The third nozzle 30C is used for dispensing filtered water. The spray nozzles 30 can be covered by a cover or shield to protect them from damage when the sprayer 20 is set down by the user.

The hose connection 32 is oriented so that the hose 24 extends at an angle β away from the sprayer 20. The angle β shown in FIG. 9 is preferably oriented so that the hose 24 will extend out from the back 20D of the sprayer, rather than straight down toward the ground. The angle α between the extension of the axis A of the handle 28 and the centerline of the hose connection 32 is preferably greater than 0° and less than about 90°. The complementary angle C that the hose connection makes with the axis A of the handle 28 is, therefore, greater than about 90° and less than about 180°. This will orient the hose 24 so that the elevated portion of a water-filled hose can be used to at least partially balance the weight of the portions of the sprayer 20 that lie in front of the axis A of the handle 28. The angle that the hose connection 32 makes will also better to allow the sprayer 20 to be conveniently set down on the ground on its front portion 20C when the sprayer 20 is not in use. When the sprayer 20 is set down in this manner, the hose 24 will run parallel to the front portion 20C and to the ground.

The filter 50 can comprise any suitable type of filter. In one non-limiting embodiment, the filter 50 comprises an ion exchange resin filter. The filter 50 can be permanent or replaceable. The filter 50 can be in any suitable configuration. Preferably, in the embodiment shown, the filter 50 is a replaceable filter that resides inside the third portion 22C of the housing 22. This filter 50 shown is a generally cylindrical "double barrel" filter, and more specifically is a housing comprised of two cylindrical portions 50A and 50B that are joined together along their axes to form a compound cylindrical filter with a cross-section that resembles the figure "8". The double barrel filter provides double the length of the filter material for the water to flow through than a cylindrical filter of the same length. The filter 50 is in a more compact configuration than an equivalent cylindrical filter provided with an equivalent length of filter material in a linear (end-to-end) arrangement. Numerous other embodiments of the filter 50 can be used to provide a similar benefit, if desired. For instance, in one non-limiting embodiment, the filter 50 can be in the form of concentric cylinders in which the water to be purified alternatively flows inside one cylinder and then outside such a cylinder but within an outer concentric cylinder. In each of these, or other embodiments, more than two cylindrical structures can be used. In other embodiments, the portions of the filters that are described as being cylindrical can have other suitable cross-sections.

The reduced overall length of the filter 50 allows the filter to be placed into the ergonomically-shaped sprayer 20 shown in the drawings. The fact that the third portion 22C of the housing angles 22 back toward the handle 28 (rather than extending straight down) also improves the ergonomics and balance of the sprayer 20 by reducing the moment arm of the filter-containing portion 22C relative to the handle. The filter 50 can be inserted into and removed from the sprayer housing 22 through an opening 54 in the lower portion 20B of the sprayer 20.

The sprayer 20 may have additional features or elements. These additional features or elements may include, but are not limited to: a cap 56 for opening and closing the compartment 46 for the substance to be dispensed; a window 58 for viewing the level of the substance in the compartment 46; a selector dial 60 (FIG. 3); and, a mechanism, such as a button 62 for releasing the filter 50 from the filter compartment 48.

The components of the sprayer 20 can be made of any suitable material. In one non-limiting embodiment, the components of the sprayer 20 are made of injection molded plastic. In such an embodiment, the housing 22 can be injection molded in two pieces or halves that are fastened together after the other components of the sprayer 20 are placed inside. The sprayer 20 can be made and assembled by methods that are well known in the art.

Figure 8:
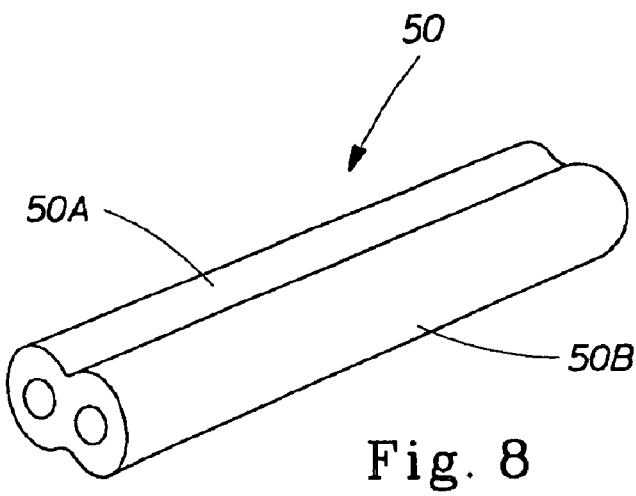
FIG. 8 is a perspective view of one non-limiting embodiment of a filter for a sprayer, such as the sprayer shown in FIG. 1.

The sprayer 20 is operated in the following manner. The user connects the hose 24 to the hose connection 32. The user then turns on the water supply to the hose. The user also selects the desired output of the sprayer (such as unpurified water, soapy water, or purified rinse water) using the selector dial 60. The user can turn the sprayer on either before, or after turning on the water supply. The user can also make the desired selection before or after turning on the water supply. As shown in FIG. 9, if the user selects the normal rinse setting, the water will flow from the hose 34 past the compartment 46 containing a substance to be dispensed, and out the first nozzle 30A. If the user selects the wash setting, the water will flow into the compartment 46, and will mix with the substance to be dispensed, which may, for example, be a soap composition, and out the second nozzle 30B. If the user selects the purified rinse setting, the water will flow through the filter 50 and out the third nozzle 30C. In the particular embodiment shown where a double barrel filter is used, as shown in FIG. 9, the water will flow into one portion of the filter 50 such as portion 50A shown in FIG. 8, and out the end of that portion. The flow conduit in the filter compartment 48 is configured so that the water will then double back and flow through another portion of the filter 50, such as portion 50B, and out nozzle 30C.

The sprayer 20 is preferably designed so that when combined with a water-filled hose having one end connected to the hose connection has a combined center of gravity (of the sprayer 20 and the portion of the hose that is held above the ground) that passes through the axis of the handle 28 to reduce the strain on the user's hand and wrist. The sprayer 20 may, thus, use the weight of the water-filled hose to balance the weight of the sprayer.

Numerous other embodiments of the spayer and its components are possible. The following are all non-limiting embodiments. In one embodiment, the hose could extend rearwardly out of the back of the top portion of the sprayer (or elsewhere between the top portion of the sprayer and the bottom portion of the sprayer). In other embodiments, the sprayer need not have a filter, and the filter-containing portion 22C may contain some other element instead of a filter. In other embodiments, the positions of the elements or components of the sprayer could be interchanged, or rearranged. In these, or other embodiments, the sprayer may have additional compartments for substances to be dispensed, such as a finish coating for a surface such as the exterior of an automobile. In such a case, there may be additional flow paths through such other compartments. In other embodiments, the flow paths can arranged so that water flows in more than one direction (e.g., clockwise and counter clockwise) around the closed loop structure formed by the housing. The sprayer 20 may also be provided with features that allow the substances to be dispensed to be metered. This will allow the user to control the amount of such substances that are mixed with the water flowing through the sprayer. If desired, the substances that are dispensed can be mixed with purified water, instead of with tap water. The sprayers described herein may also have other features, and provide other benefits that do not require the sprayers to have an ergonomic design.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the subject invention have been described, it will be obvious to those skilled in the art that various changes and modifications of the subject invention can be made without departing from the spirit and scope of the invention. It will be clear to those skilled in the art that various changes and modifications may be made without departing from the scope of the invention and the invention is not to be considered limited to the embodiments that are described in the specification.

What is claimed is:

1. A hand-held ergonomic sprayer comprising:
    a housing having at least a portion through which water flows, said housing having a barrel portion;
    a handle for gripping by a user, said handle having an axis, said handle being joined to said barrel portion of said housing;
    at least one spray nozzle operatively connected to said housing; and,
    a connection for a hose, said connection being joined to said housing,
    wherein said axis of the handle forms an angle of between about 75° to less than about 180° with said barrel portion, and said housing when combined with an elevated portion of a water-filled hose having an end connected to said connection, has a combined center of gravity with said elevated portion of the hose that passes through the axis of said handle.

2. The sprayer of claim 1 wherein said handle comprises a portion of said housing through which water flows.

3. The sprayer of claim 1 wherein said connection for a hose extends rearwardly from said sprayer housing at an angle.

4. The sprayer of claim 1 comprising multiple flow nozzles.

5. The sprayer of claim 1 comprising a water purifier.

6. The sprayer of claim 1 further comprising a compartment for a composition to be dispensed wherein said compartment is located within said sprayer housing.

* * * * *

UNITED STATES PATENT AND TRADEMARK OFFICE
CERTIFICATE OF CORRECTION

PATENT NO.         : 7,410,105 B2                                  Page 1 of 1
APPLICATION NO. : 09/950841
DATED              : August 12, 2008
INVENTOR(S)        : Richard Lawrence Horstman et al.

It is certified that error appears in the above-identified patent and that said Letters Patent is hereby corrected as shown below:

Column 3
Line 57, delete "α" and insert -- β --.

Signed and Sealed this

Twenty-sixth Day of May, 2009

JOHN DOLL
*Acting Director of the United States Patent and Trademark Office*